United States Patent [19]

Kato et al.

[11] Patent Number: 5,201,250

[45] Date of Patent: Apr. 13, 1993

[54] FUEL CUT-OFF INHIBIT FOR A POWER-OFF UPSHIFT

[75] Inventors: Yuji Kato, Tokyo; Tatsuo Wakahara, Kawasaki; Shigeki Shimanaka, Hadano; Hiroshi Asano, Zama; Shinsuke Nakazawa, Yokohama; Hiroshi Sasaki, Yokohama; Hiroshi Yamaguchi, Yokohama; Kazuhiro Ishigami, Sagamihara; Shinichi Takenouchi, Yokosuka, all of Japan

[73] Assignee: Nissan Motor Co., Ltd., Yokohama, Japan

[21] Appl. No.: 751,805

[22] Filed: Aug. 30, 1991

[30] Foreign Application Priority Data

Aug. 31, 1990 [JP] Japan ................................. 2-230956

[51] Int. Cl.$^5$ ...................... F16H 59/24; F02D 41/12
[52] U.S. Cl. ........................................ 74/858; 74/866
[58] Field of Search ................ 74/857, 858, 860, 866; 364/424.1; 123/325, 493

[56] References Cited

U.S. PATENT DOCUMENTS

| | | | |
|---|---|---|---|
| 4,539,643 | 9/1985 | Suzuki et al. | 364/424.1 X |
| 4,945,482 | 7/1990 | Nishikawa et al. | 364/424.1 X |
| 4,970,916 | 11/1990 | Nakita | 364/424.1 X |
| 5,016,494 | 5/1991 | Yamaguchi | 74/857 |
| 5,021,956 | 6/1991 | Yoshimura et al. | 74/866 X |
| 5,036,728 | 8/1971 | Kawasoe et al. | 74/858 |
| 5,038,287 | 8/1991 | Taniguchi | 74/858 |
| 5,146,891 | 9/1992 | Nakazawa et al. | 123/325 |

FOREIGN PATENT DOCUMENTS

| | | |
|---|---|---|
| 0354541 | 2/1990 | European Pat. Off. . |
| 88333 | 3/1990 | Japan .................... 74/857 |

Primary Examiner—Richard M. Lorence
Assistant Examiner—Khoi Q. Ta
Attorney, Agent, or Firm—Lowe, Price, LeBlanc & Becker

[57] ABSTRACT

A predetermined control on an engine, i.e., a fuel-cut operation, is executed after an accelerator has been released under predetermined conditions when vehicle speed is higher than a fuel-cut vehicle speed value and engine speed is higher than or equal to a fuel-cut engine speed value. In an automatic transmission drivingly connected to the engine via a torque converter, a gear shift is initiated after the accelerator has been released. During a shift of the same kind, there occurs a variability in shift shock between the cases with and without the execution of the fuel-cut operation. In order to reduce this variability, the execution of the fuel-cut operation is inhibited until completion of the shift after the accelerator has been released under the predetermined conditions.

8 Claims, 4 Drawing Sheets

FUEL CUT-OFF INHIBIT FOR A POWER-OFF UPSHIFT

BACKGROUND OF THE INVENTION

The present invention relates to a motor vehicle having an engine and an automatic transmission drivingly connected to the engine and more particularly to an engine control during a gear shifting after an accelerator has been released.

A so-called fuel-cut operation at deceleration is a well known measure for reduced emission of HC (hydrocarbon) and fuel consumption. According to a known control for such fuel-cut operation at deceleration, the fuel-cut operation is executed after an accelerator pedal has been released under predetermined vehicle speed and engine speed conditions. During the fuel-cut operation, cylinder injection of fuel by some of fuel injectors is suspended. In an automatic transmission, an upshift in gear position is initiated after the accelerator has been released. Thus, there can occur a situation where the fuel-cut operation is executed during the shift after the accelerator has been released when the predetermined vehicle speed and engine conditions are satisfied and another situation where the fuel-cut operation is not executed during the shift of the same kind after the accelerator pedal has been released when the predetermined conditions are not satisfied. In the former case, the engine speed drops quickly, while in the latter case, the engine speed drops less quickly. This difference in change in engine speed after the accelerator has been released causes difficulty in reducing a variability in shift shock taking place during the shift of the same kind.

An object of the present invention is to provide an appropriate engine control without causing any substantial variability in shift shock during a shift in gear position initiated after an accelerator has been released.

SUMMARY OF THE INVENTION

According to one aspect of the present invention, there is provided a motor vehicle comprising:
  an engine;
  an accelerator operatively connected to the engine;
  means for detecting a position of said accelerator and for generating a corresponding signal when said accelerator is released;
  an automatic transmission drivingly connected to the engine, said automatic transmission being subject to a shift in gear position after generation of said signal; and
  means for inhibiting execution of a predetermined control on said engine at least until initiation of said shift after generation of said signal said accelerator has been released and thereafter initiating the execution of said predetermined control during generation of said signal under said predetermined conditions.

According to another aspect of the present invention there is provided a method of an engine control of a motor vehicle having an accelerator operatively connected to the engine and an automatic transmission drivingly connected to the engine, the automatic transmission being subject to a shift in gear position after the accelerator has been released under predetermined conditions, the method comprising the steps of:
  detecting a position of the accelerator;
  generating a signal when the accelerator is released;
  inhibiting execution of a predetermined control on the engine until completion of the shift after generation of said signal under said predetermined conditions; and
  initiating the execution of said predetermined control during generation of said signal under said predetermined conditions after the completion of the shift.

DETAILED DESCRIPTION OF THE INVENTION

Figure 1:
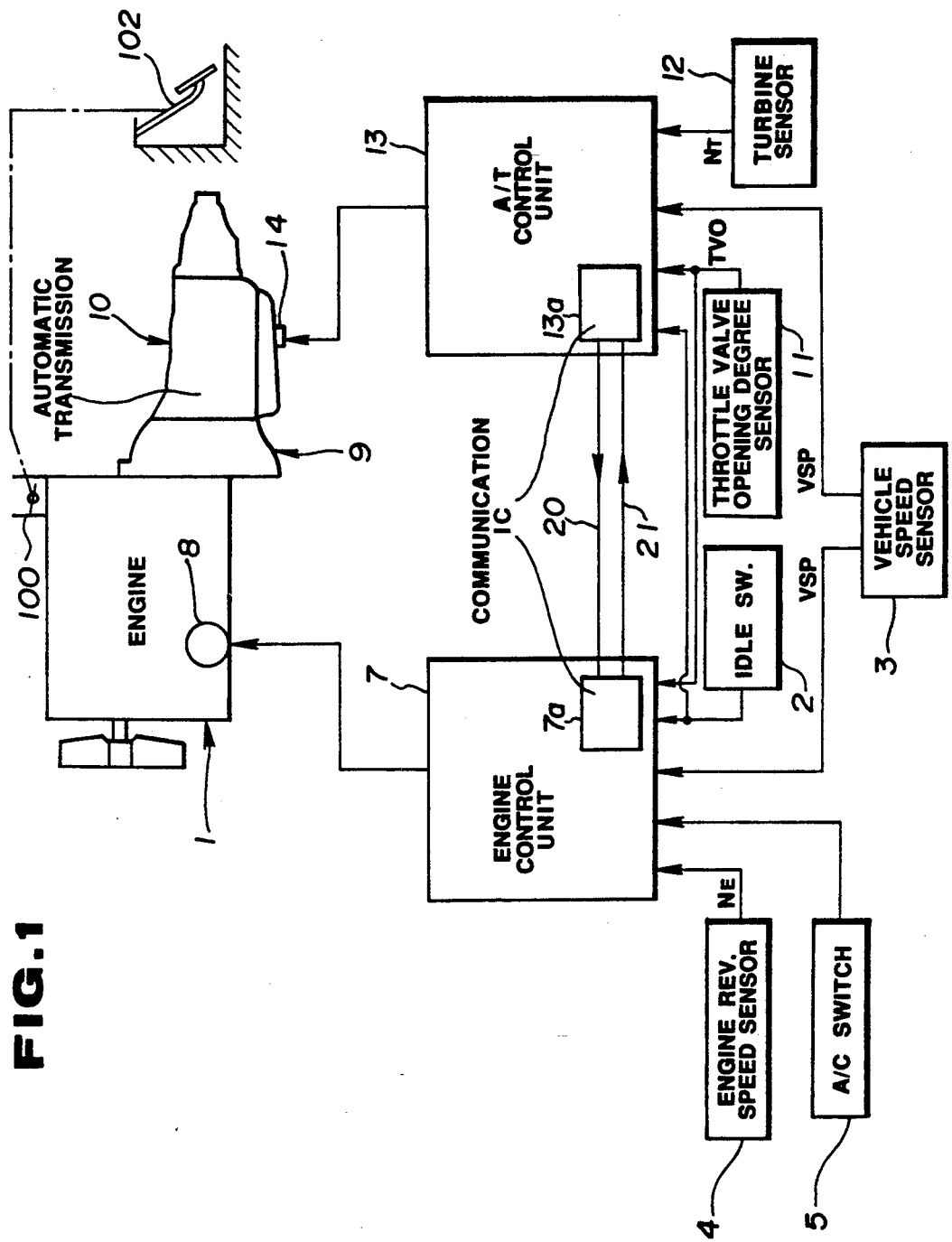
FIG. 1 is a view showing a portion of a motor vehicle.

FIG. 1 shows a portion of a motor vehicle including an accelerator 102, an engine 1, a torque converter 9 and an automatic transmission 10. The engine 1 has a throttle valve 100 operatively connected to the accelerator 102 and opens in degrees as the accelerator 102 is depressed to increase its opening degree. In this embodiment, the engine 1 with the throttle valve 100 is employed. Alternatively, a diesel engine may be used. In this case, a control lever of a fuel injection pump is operatively connected to the accelerator 102.

The engine 1 is of the fuel-injection type and includes a plurality of fuel injectors shown at the reference numeral 8 which inject fuel to all of the engine cylinders in a sequential manner. The timing and amount of fuel to be injected by each of the fuel injectors 8 are controlled by a microcomputer-based engine control unit 7.

A throttle valve opening degree sensor 11 and an idle switch 2 are arranged to detect a position of the throttle valve 100. Since the throttle valve 100 is operatively connected to the accelerator 102, the idle switch 2 is ON when the accelerator 102 is released or the accelerator opening degree is less than a small value although it is OFF when the accelerator 102 is depressed or the accelerator opening degree is not less than the small value. The throttle sensor 11 generates a throttle opening degree indicative signal TVO indicative of the throttle opening degree of the throttle valve 100 and thus the accelerator opening degree of the accelerator 102. If the diesel engine is used, a control lever sensor is arranged to detect the position of the control lever of the fuel injection pump and the output of the control lever sensor is used to detect the accelerator opening degree of the accelerator 102.

A vehicle speed sensor 3 is a transmission output shaft revolution speed sensor arranged to detect a revolution speed of an output shaft of the automatic transmission 10. The vehicle speed sensor 3 generates a vehicle speed indicative signal VSP indicative of the detected revolution speed of the transmission output shaft ($N_O$).

An engine revolution speed sensor 4 is arranged to detect a revolution speed of the engine 1 and generates an engine speed signal $N_E$ indicative of the detected revolution speed of the engine 1.

An air conditioner (A/C) switch 5 of an engine driven air conditioner, not shown, is provided as an indicator whether the air conditioner is in operation or not.

A turbine sensor 12 is arranged to detect a revolution speed of a turbine shaft of the torque converter 9 and generates a turbine speed signal $N_T$ indicative of the detected revolution speed of the turbine shaft.

The outputs of the idle switch 2, vehicle speed sensor 3, engine speed sensor 4 and A/C switch 5 are fed to the engine control unit 7 and used as data for executing a so-called fuel-cut operation at deceleration. The output of the throttle sensor TVO is fed to the engine control unit 7, too.

The automatic transmission 10 is shiftable among a plurality of gear positions in discrete manner and includes a plurality of so-called shift solenoids shown at the reference numeral 14. A shift in gear poasition in the automatic transmission is initiated when one of the shift solenoids switch from one state before the shift to the other state after the shift. These shift solenoids 14 are controlled by a microcomputer based automatic transmission (A/T) control unit 13. The A/T control unit 13 stores a shift point mapping table (or shift schedule table) as shown in FIG. 2.

Figure 2:
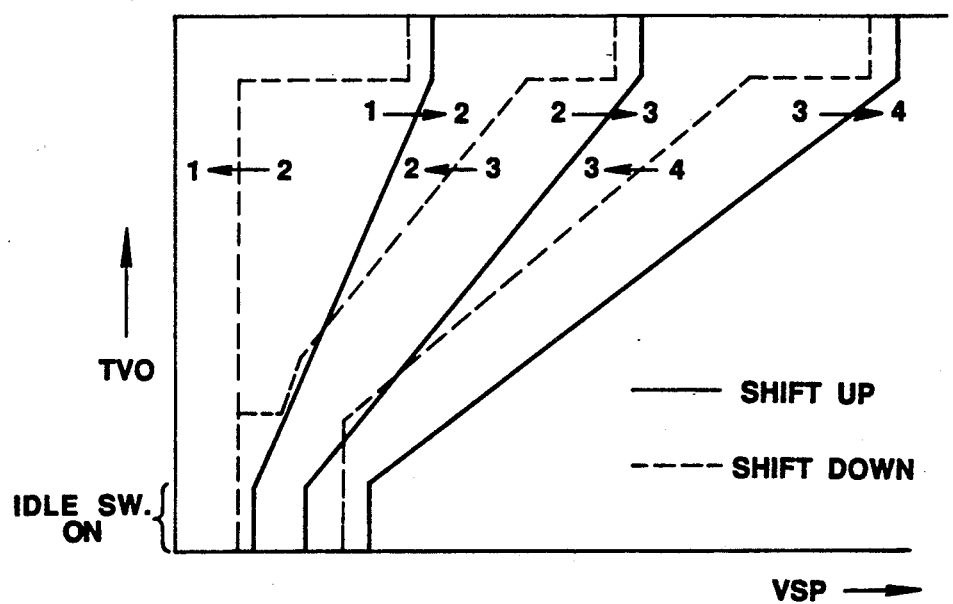
FIG. 2 is a shift point mapping table showing a plurality of shift-up and shift-down schedule lines.

The outputs of the throttle sensor 11 and vehicle speed sensor 3 are fed to the A/T control unit 13 and used to perform a table look-up operation of the table shown in FIG. 2 to determine a target or desired gear position (GT) appropriate to the accelerator opening degree and vehicle speed. The outputs of the idle switch 2 and the engine speed $N_E$, are supplied to the A/T control unit 13 via the engine control unit 7. The output from turbine sensor 12 is preferably provided to the A/T control unit directly, as best seen in FIG. 1. In order to facilitate signal transmission between the two control units 7 and 13, the engine control unit 7 includes a communication integrated circuit (IC) 7a and the A/T control unit 13 a communication integrated circuit (IC) 13a. These communication ICs 7a and 13a are linked by two transmission lines 20 and 21.

Figure 3:
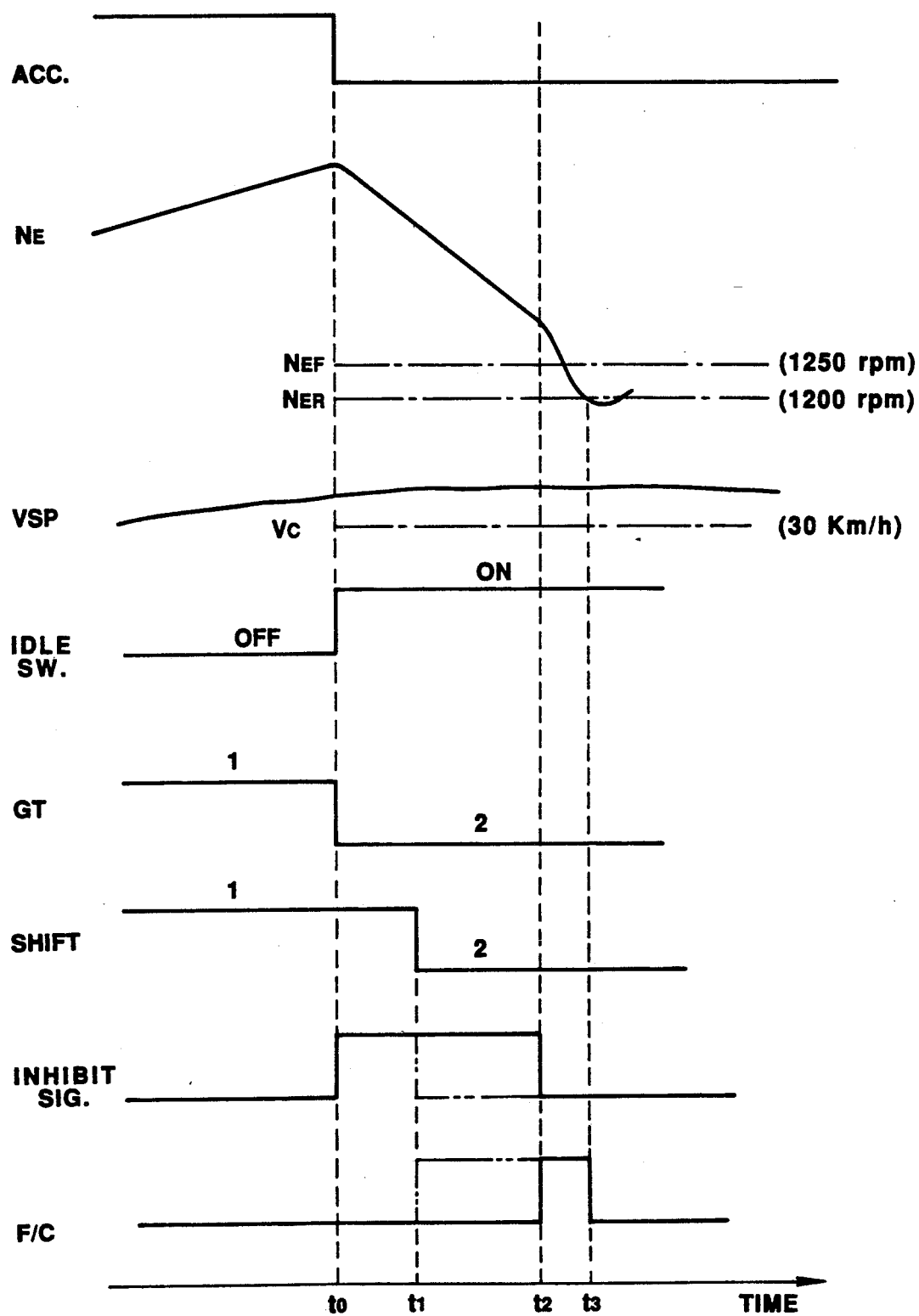
FIG. 3 is a signal timing diagram illustrating the operation of the invention.

The principal operation of the invention is explained below in connection with FIG. 3. FIG. 3 is a signal diagram during a power-off upshift initiated after the accelerator has been released.

Illustrated at the upper portion in FIG. 3 is a release of the accelerator 102 as shown by a drop in accelerator opening degree. The release of the accelerator 102 occurs at a moment $t_0$. At this moment $t_0$, the idle switch 2 is closed and thus the output of the idle switch 2 changes from OFF level to ON level, causing a fuel-cut inhibit signal to appear. Since a table look-up operation of FIG. 2 is repeatedly performed using the throttle opening degree TVO data and vehicle speed VSP data to give a target gear position GT, the target gear position GT changes from the first gear to the second gear at the moment $t_0$. In this example, the vehicle speed VSP is higher than a predetermined fuel-cut vehicle speed value $V_C$ ($=30$ km/h, for example) and engine speed $N_E$ is higher than the fuel-cut engine speed value $N_{EF}$ ($=1250$ rpm) upon releasing the accelerator 102 at the moment $t_0$. However, since the fuel-cut inhibit signal is present, the execution of fuel-cut operation is not initiated. After the moment $t_0$, the engine speed $N_E$ decreases. At a moment $t_1$, one of the shift solenoids changes from a state before the shift to the other state after the shift. Thus, it is regarded that the 1-2 shift operation is initiated at this moment $t_1$. At a moment $t_2$, the shift operation is completed. The completion of the shift operation is recognized when an actual gear ratio $N_T/VSP$ drops below a predetermined value set slightly higher than a gear ratio predetermined for the second gear position. At this momemt $t_2$, the inhibit signal disappears and thus the execution, allowing the initiation of the fuel-cut operation since the vehicle speed condition and the engine speed condition are maintained. After the moment $t_2$, the engine speed drops quickly. At a momemt $t_3$, the engine speed $N_E$ drops below a recovery engine speed value $N_{ER}$ ($=1200$ rpm, for example), the execution of fuel-cut operation ends. The period of time in which the fuel-cut operation is executed is indicated by a fuel-cut operation signal F/C. From the preceding description, it is readily seen that the fuel-cut operation is executed between the moments $t_2$ and $t_3$, in this example.

The time duration of the inhibit signal may be reduced to increase the time duration of the fuel-cut signal F/C for more fuel saving. As illustrated by two-dot chain line, the end of the time duration of the inhibit signal may concur with the initiation of the shift at the moment $t_1$. In this case, the start of the fuel-cut operation signal F/C concurs with the end of the inhibit signal at the moment $t_1$.

Referring also to FIG. 1, the outputs of the idle switch 2, throttle sensor 11, vehicle speed sensor 3 and turbine sensor 12 are fed to the automatic transmission control unit 13. The output of the engine speed sensor 4 is fed to the engine control unit 7 and then transmitted via the communication line 21 to the automatic transmission control unit 13.

In the automatic transmission control unit 13, the table look-up operation of FIG. 2 is performed using the throttle opening degree TVO and vehicle speed VSP to determine a target gear position GT. The engine speed $N_E$ and turbine speed $N_T$ are used to determine a speed ratio between a pump impeller and a turbine runner of the torque converter 9. The initiation of the shift is inhibited until the engine speed establishes a predetermined relationship with the turbine speed. This explains why there is a delay between the occurrence of a shift requirement (the moment $t_0$) and the initiation of the shift (the moment $t_1$). The start of the fuel-cut inhibition is determined by the occurrence of the shift command and the end is determined by the completion of the shift. This fuel-cut inhibit signal is transmitted via the communication IC 13a to the engine control unit 7.

In the engine control unit 7, the execution of fuel-cut operation is controlled in such a manner as briefly explained below along a flow diagram shown in FIG. 4. This flow diagram is a sub-routine executed at regular intervals.

Figure 4:
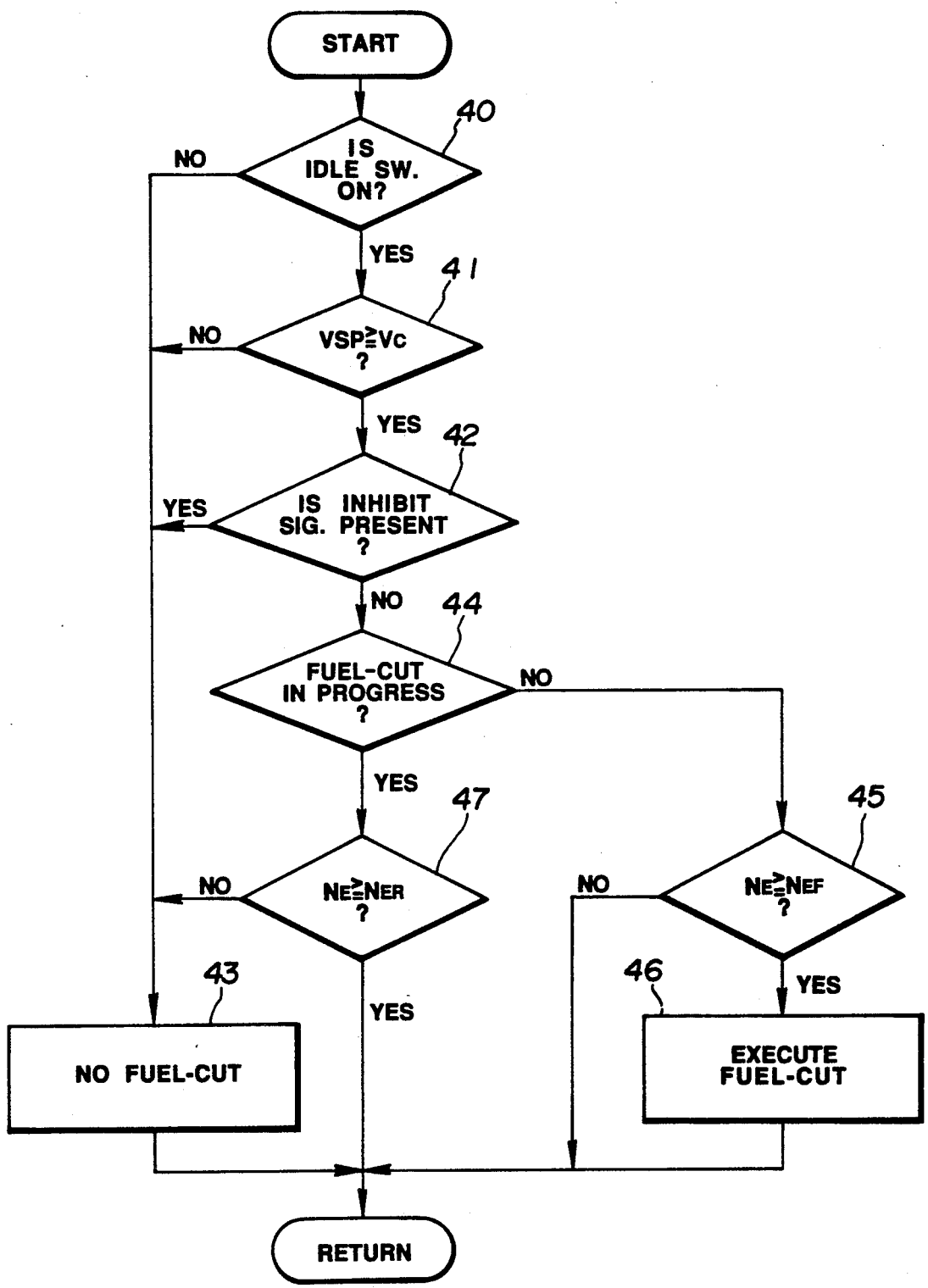
FIG. 4 is a flow diagram.

In FIG. 4, there is an interrogation at a step 40 whether the idle switch 2 is ON or not. If this is the case, the routine proceeds to another interrogation at a step 41 whether the vehicle speed VSP is higher than or equal to the fuel-cut vehicle speed $V_C$ or not. If this is the case, the routine proceeds to an interrogation 42 whether the fuel-cut inhibit signal is present or not. If this is the case, the routine proceeds to a step 43 where the fuel-cut operation is inhibited before returning to the initial START point. This flow is repeated during a period of time between $t_0$ and $t_2$. In the subsequent run at or after the moment $t_2$, the interrogation at step 42 results in a negative and the routine proceeds to an interrogation at a step 44 whether the fuel-cut operation is in progress or not. Since the fuel-cut operation is not yet executed, the interrogation at step 44 results in a negative and the routine proceeds to an interrogation at a step 45 whether the engine speed $N_E$ is higher than or equal to the fuel-cut engine speed value $N_{EF}$ or not.

Since this is the case at the moment $t_2$, the routine proceeds to a step 46 where the fuel-cut operation is allowed. Thus, the execution of the fuel-cut operation is initiated at the moment $t_2$. In any of the subsequent runs of the routine prior to the moment $t_3$, the interrogation at step 44 results in an affirmative and the routine proceeds to an interrogation at a step 47 whether the engine speed $N_E$ is higher than or equal to the recovery engine speed value $N_{ER}$ that is lower than $N_{EF}$. Since this is the case, the routine returns to the initial START point. Thus, the fuel-cut operation is maintained. In the subsequent run of the routine at or after the moment $t_3$, the interrogation at step 47 results in a negative and the routine proceeds to the step 43, thus terminating the fuel-cut operation.

If the interrogation at step 40 or 41 results in a negative, the fuel-cut operation is inhibited and thus not executed.

From the previous description, it is now seen that the execution of the predetermined control, i.e., the fuel-cut operation in the previously described embodiment, on the engine 1 is inhibited at least until initiation (the moment $t_1$) of the shift after the accelerator 102 has been released under the predetermined conditions where the vehicle speed VSP is higher than or equal to the fuel-cut vehicle speed value $V_C$ and the engine speed $N_E$ is higher than or equal to the fuel-cut engine speed value $N_{EF}$. More specifically, the execution of the above-mentioned predetermined conctol on the engine 1 is inhibited until completion of the shift (the moment $t_2$).

It is also seen that the execution of the predetermined control on the engine 1 is initiated after the initiation (the moment $t_1$) of the shift when or if the predetermined conditions are maintained. More specifically, the execution of the predetermined control on the engine 1 is initiated after the completion (the moment $t_2$) of the shift when or if the predetermined conditions are maintained.

The features listed below are derived from the previously described embodiment according to the present invention.

The execution of a predetermined control on the engine is inhibited until completion of a shift in gear position after an accelerator has been released under the predetermined conditions. Thus, a first time derivative of engine speed after the accelerator has been released is kept unchanged, reducing variability in shift shock during the shift of the same kind.

The execution of the predetermined control is initiated after the completion of the shift when or if the predetermined conditions are maintained. Since a period of time during which the execution of the predetermined control is inhibited ends with the completion of the shift. Reduced fuel consumption owing to fuel-cut at deceleration is not détériorated.

In the previously described embodiment, the execution of the predetermined control on the engine is initiated upon completion of the shift. The period of time in which the execution of the predetermined control is inhibited may extend after the completion of shift in gear position.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A motor vehicle, comprising:
    an engine;
    an accelerator operatively connected to the engine;
    means for detecting a position of said accelerator and for generating a corresponding signal when said accelerator is released;
    an automatic transmission drivingly connected to the engine, said automatic transmission being subject to a shift in gear position after generation of said signal; and
    means for inhibiting execution of a predetermined control on said engine at least until initiation of said shift after generation of said signal under predetermined conditions and for thereafter initiating the execution of said predetermined control during generation of said signal under said predetermined conditions.

2. A motor vehicle, comprising:
    an engine;
    an accelerator operatively connected to the engine;
    an automatic transmission drivingly connected to the engine, said automatic transmission being subject to a shift in gear position after said accelerator has been released; and
    means for executing a predetermined control on said engine after said accelerator has been released under predetermined conditions;
    wherein the execution of said predetermined control on said engine is inhibited until completion of said shift after said accelerator has been released under said predetermined conditions and the execution of predetermined control is initiated thereafter when the predetermined conditions are maintained.

3. A motor vehicle as claimed in claim 1, wherein the execution of said predetermined control on said engine is initiated after the initiation of said shift when said predetermined conditions are maintained.

4. A motor vehicle, comprising:
    an engine;
    an accelerator operatively connected to the engine;
    an automatic transmission drivingly connected to the engine, said automatic transmission being subject to a shift in gear position after said accelerator has been released;
    means for executing a predetermined control on said engine after said accelerator has been released under predetermined conditions;
    wherein the execution of said predetermined control on said engine is inhibited at least till initiation of said shift after said accelerator has been released under said predetermined conditions and is initiated after the completion of said shift when said predetermined conditions are maintained.

5. A method for controlling an engine of a motor vehicle having an accelerator operatively connected to the engine and an automatic transmission drivingly connected to the engine, the automatic transmission being subject to a shift in gear position after the accelerator has been released under predetermined conditions, comprising the steps of:
    detecting a position of the accelerator;
    generating a signal when the accelerator is released;
    inhibiting execution of a predetermined control on the engine until completion of the shift after generation of said signal under said predetermined conditions; and initiating the execution of said predetermined control during generation of said signal under said predetermined conditions after the completion of the shift.

6. A motor vehicle, comprising:

an engine;

an accelerator operatively connected to the engine;

means for detecting a position of said accelerator and generating a signal when said accelerator is released;

an automatic transmission drivingly connected to the engine, said automatic transmission being subject to a shift in gear position after generation of said signal;

means for inhibiting execution of a predetermined fuel-cut operation on said engine at least until initiation of said shift after generation of said signal under predetermined conditions and thereafter allowing the execution of said fuel-cut operation during generation of said signal under said predetermined conditions.

7. A motor vehicle, comprising:

an engine;

an accelerator operatively connected to the engine;

means for detecting a position of said accelerator and generating a signal when said accelerator is released;

an automatic transmission drivingly connected to the engine, said automatic transmission being subject to a shift in gear position after generation of said signal; and means for inhibiting execution of a predetermined fuel-cut operation on said engine until completion of said shift after generation of said signal under predetermined conditions and thereafter initiating the execution of said fuel-cut operation during generation of said signal under said predetermined conditions.

8. A motor vehicle, comprising:

an engine;

an accelerator operatively connected to the engine;

means for detecting a position of said accelerator and generating a signal when said accelerator is released;

an automatic transmission drivingly connected to the engine, said automatic transmission being subject to a shift in gear position after generation of said signal; and means for inhibiting execution of a predetermined fuel-cut operation on said engine until completion of said shift after generation of said signal under predetermined conditions and thereafter initiating the execution of said fuel-cut operation during generation of said signal under said predetermined conditions after the completion of said shift.

* * * * *